United States Patent [19]
Felix et al.

[11] 3,892,530
[45] July 1, 1975

[54] COLORIMETRIC AND FLUOROMETRIC METHOD

[75] Inventors: Arthur Martin Felix, West Caldwell; Voldemar Toome, Nutley; Manfred Weigele, North Caldwell, all of N.J.

[73] Assignee: Hoffmann-La Roche Inc., Nutley, N.J.

[22] Filed: Sept. 23, 1974

[21] Appl. No.: 508,599

[52] U.S. Cl. .............................. 23/230 R; 23/230 M
[51] Int. Cl. ..................... G01n 21/52; G01n 31/22
[58] Field of Search ...................... 23/230 R, 230 M

[56] References Cited
UNITED STATES PATENTS
| | | | |
|---|---|---|---|
| 3,689,221 | 9/1972 | Udenfriend | 23/230 R |
| 3,812,181 | 5/1974 | Leimgruber et al. | 260/520 |
| 3,830,629 | 8/1974 | Leimgruber et al. | 23/230 R |

OTHER PUBLICATIONS
Moore et al., "Photometric Ninhydrin Method for Use in the Chromat. of Amino Acids," J. Biol. Chem., Vol. 176, 1948, pp. 367-388.

Udenfriend et al., "Fluorescamine: A Reagent for Assay of Amino Acids, Petitdes, Proteins . . .," Science, Vol. 178, No. 4056, 1972, pp. 871-872.

Georgiadios et al., "Single Col. Anal. of Amino Acids in Protein Hydrolysates Utilizing the Fluorescamine Reaction," Chem. Astr. Vol. 79, No. 143650d, 1973.

Primary Examiner—Joseph Scovronek
Assistant Examiner—Arnold Turk
Attorney, Agent, or Firm—Samuel L. Welt; Jon S. Saxe; George M. Gould

[57] ABSTRACT

Primary and secondary amino acids form chromophores with fluorescamine and its related class of fluorogens which chromophores can be used as the basis for simultaneous fluorometric and colorimetric analysis of such amino acids.

8 Claims, 11 Drawing Figures

COLORIMETRIC AND FLUOROMETRIC METHOD

BACKGROUND OF THE INVENTION

U.S. Pat. No. 3,812,181 describes a new class of reagents (fluorogens) which react rapidly at room temperature with primary amine-containing compounds (e.g., amino acids and peptides) to afford highly fluorescent products thereby providing the basis for a fast, highly sensitive fluorescence assay procedure for primary amine-containing compounds.

One major disadvantage with the above method is that secondary amino acids such as proline, 4-hydroxyproline and other related compounds, which form part of the complement of naturally occurring amino acids did not produce fluorescent products with the aforesaid fluorogenic reagents and were undetectable in the fluorescence assay.

In order to overcome this problem a new procedure for fluorometrically assaying secondary amino acids with the aforesaid fluorogen reagents was developed. Such procedure is described in U.S. Pat. No. 3,830,629. The procedure involves the conversion of a secondary alpha-amino acid to a primary amine by treating the test substrate with an oxidation-decarboxylation-hydrolysis sequence initiated by a source of active chlorine or bromine followed by reaction of the primary amine with the fluorogen to produce a fluorescent compound which is then detected.

The aforesaid procedure for secondary amino acids does have its drawbacks. If one desires to run a simultaneous assay for both primary and secondary amino acid compounds, the sensitivity obtained with respect to the primary amino acids is lowered due to side reactions caused by the treatment with reagents used in the oxidation-decarboxylation-hydrolysis sequence. On the other hand, separation of the assay into independent runs for detection of the primary amino acids and secondary amino acids requires a larger sample, more complicated instrumentation such as added valves, reagent reservoirs and pumps and a longer analysis time.

It has also been suggested to utilize the addition of the source of active chlorine or bromine on an intermittent basis. The addition would be timed to coincide with the retention time of the secondary amino acids and thus this reagent would be present only when secondary amino acids were coming off the column. Obviously, such system would require complex timing circuitry.

DESCRIPTION OF THE INVENTION

The present invention relates to the discovery that primary and secondary amino acids react with a compound of the formula

I wherein R is hydrogen, halogen, lower alkyl or lower alkoxy and R' is lower alkyl or aryl
to produce chromophoric products which are detectable colorimetrically. It is thus possible to utilize this phenomenon to conduct simultaneous assay of primary and secondary amino acid containing samples. A preferred reagent of formula I is obtained when R is hydrogen and R' is phenyl, that is 4-phenylspiro[furan-2(3H)-1'-phthalan]-3,3'-dione (fluorescamine).

The chromophores produced in accordance with the present invention provide a means for obtaining a colorimetric assay for both primary and secondary amino acids which is linear in response up to a concentration level of at least 1000 nanomoles. This is in contrast to the fluorometric analysis using the same class of fluorogens which exhibits a linear response only up to a concentration level of about 10–25 nanomoles. Thus the instant colorimetric procedure can be used for quantitative primary and secondary amino acid assay at substantially higher amino acid levels than obtained by fluorometric techniques thereby eliminating the need for numerous dilution and rerun operations.

The chromophores produced by the instant invention are believed to have structure II, when derived from primary amino acids, and structure III, when derived from secondary amino acids:

wherein in these structural formulae R and R' are as above, R'' is hydrogen, lower alkyl, aralkyl or aryl, R''' is lower alkyl. In formula III, R'' and R''' taken together are $-(CH_2)_n-$, where $n$ is an integer from 1 to 5.

The term "aryl" as used above is meant to include phenyl and hydroxy or methoxy mono-, di- or tri- substituted phenyl. The term "aralkyl" as used above is meant to include phenyl lower alkyl, e.g., benzyl, hydroxy or methoxy mono-, di- or tri- substituted benzyl; hydroxy or methoxy mono- or di-substituted indolylmethyl, and imidazolyl-3-methyl.

The chromophore structures are not critical to the practice of the invention and can of course be varied in the nature of the substituents by changing the primary or secondary amino acids employed in the assay.

The aforesaid chromophores are formed by the reaction of the reagents of formula I and the primary and secondary amino acids utilizing conditions which are identical to those employed in the fluorometric assay utilizing the aforesaid reagents of formula I and which are well known in the art. Such conditions may include, for example, room temperature, a pH in the range of from about 8.5 to 9.0 (conveniently obtained by use of aqueous borate buffer), excess reagent of formula I and the use of a water miscible organic solvent preferably acetone for dissolving the reagent of formula I.

The said chromophores may readily be detected by standard colorimetric techniques employing absorbance measurements of monochromatic light having a wavelength in the range of 300–410 nanometers. In particular it has been observed that the chromophores resulting from primary amino acids exhibit an absorption maximum in the range of about 380–410 nanometers while the chromophores resulting from secondary amino acids exhibit an absorption maximum in the range of about 300–330 nanometers with an inflection at 340–360 nanometers. Thus, secondary amino acids can be measured utilizing wavelengths in the range of 300–380 nanometers. Due to possible interference with the absorption maximum of the excess reagent of formula I, it is preferable to utilize 350 nanometers as the wavelength for detecting secondary amino acid exclusively. When both primary and secondary amino acids are being detected simultaneously then the preferred wavelength to be employed is 380 nanometers. In this manner one can also conveniently carry out a simultaneous fluorometric analysis of the sample since the excitation maximum for the primary amino acid fluorophor formed by reaction with fluorescamine is 385 nanometers.

Use of simultaneous colorimetric and fluorometric assay is extremely advantageous. Since it is known that secondary amino acids do not produce fluorophors by direct reaction with reagents of formula I but do produce chromophores, examination of the fluorometric and colorimetric absorption curves will give immediate information as to whether a particular material coming off a column is a primary or a secondary amino acid. Thus, if at a specific retention time peaks are seen on both the fluorometric and colorimetric curves, then a primary amino acid has been detected whereas if a peak appears only in the colorimetric curve, then a secondary amino acid has been detected.

Figure 1:
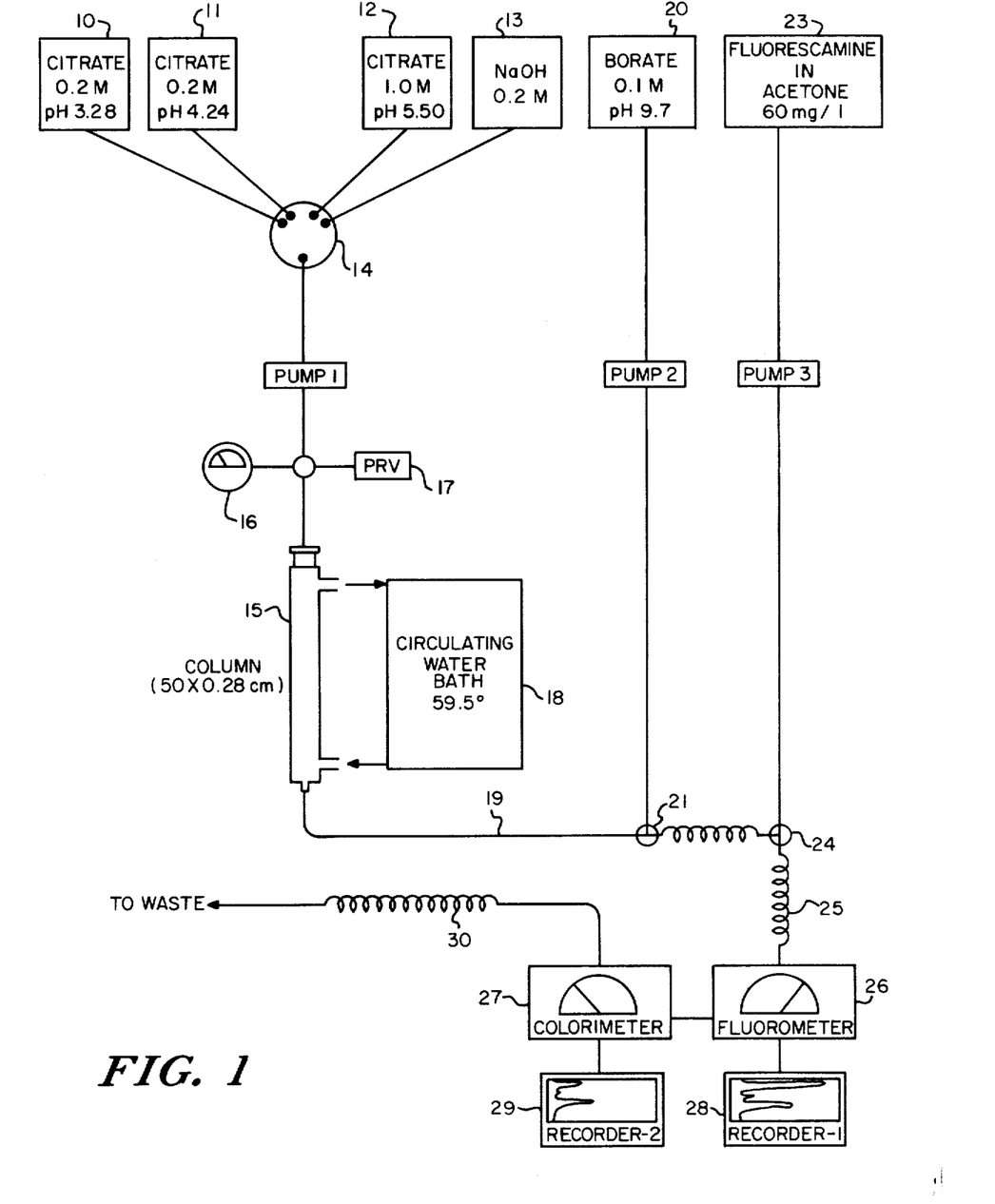

A suitable apparatus for carrying out simultaneous fluorometric and colorimetric analyses is shown in FIG. 1 of the accompanying drawings. In the said apparatus buffers for eluting amino acids from separating columns in a manner known per se are supplied in predetermined sequence from reservoirs 10, 11 and 12 through valve means 14 and pump 1 to separating column means 15. Pressure gauge 16 and pressure release valve 17 are provided to assure a proper operating pressure of about 200 to 800 psig, preferably 500 psig. Reservoir 13 provides a solution of base, i.e., NaOH, to regenerate the column after the completion of a run.

Separating column means 15 is packed with a separating medium conventionally employed in the art for separating amino acids, such as, for example, a cation exchange resin prepared from a sulphonated polystyrene such as Durrum DC-4A resin. A circulating water bath 18 is employed to maintain the desired temperature for the separation and elution.

The sample containing the amino acids to be assayed has previously been applied to the column and the individual amino acids are eluted by the buffers in a sequence depending on their respective retention times from the column into line 19. Adjustment of the pH in the eluent stream is accomplished by addition of a predetermined amount of borate buffer pH 9.7 so as to produce a final pH in the eluent stream in the desired range of 8.5 to 9.0. The borate buffer is provided from reservoir 20 via pump 2 into tee 21 where it joins the eluent stream. Mixing of the borate buffer with the eluent stream is accomplished in mixing coil 22.

The eluent stream is then treated with a 10 to 500 fold excess of a reagent of formula I, e.g., fluorescamine dissolved in acetone which is provided by reservoir 23 via pump 3 and tee 24. Reaction occurs rapidly at room temperature in mixing coil 25 and the resulting fluorophors and chromophors in the eluent stream are detected serially by fluorometer 26 and colorimeter 27. The respective absorption spectra are recorded on recorders 28 and 29. The effluent is then passed to waste through hold up coil 30.

In an alternative mode, the separate fluorometer and colorimeter instruments may be combined into a single unit such as a DuPont model 836 analyzer wherein the monochromatic light beam which passes 180° through the sample is detected by a colorimeter and light reflected 90° by the sample is detected by a fluorometer. This type of instrument, while affording simultaneous colorimetric and fluorometric analyses has the disadvantage that only one wavelength can be used for the colorimetric and fluorometric measurements whereas in the mode using separate units each unit can be set at a different wavelength to correspond to desired maxima of the fluorophors and chromophors to be assayed.

Figure 2:
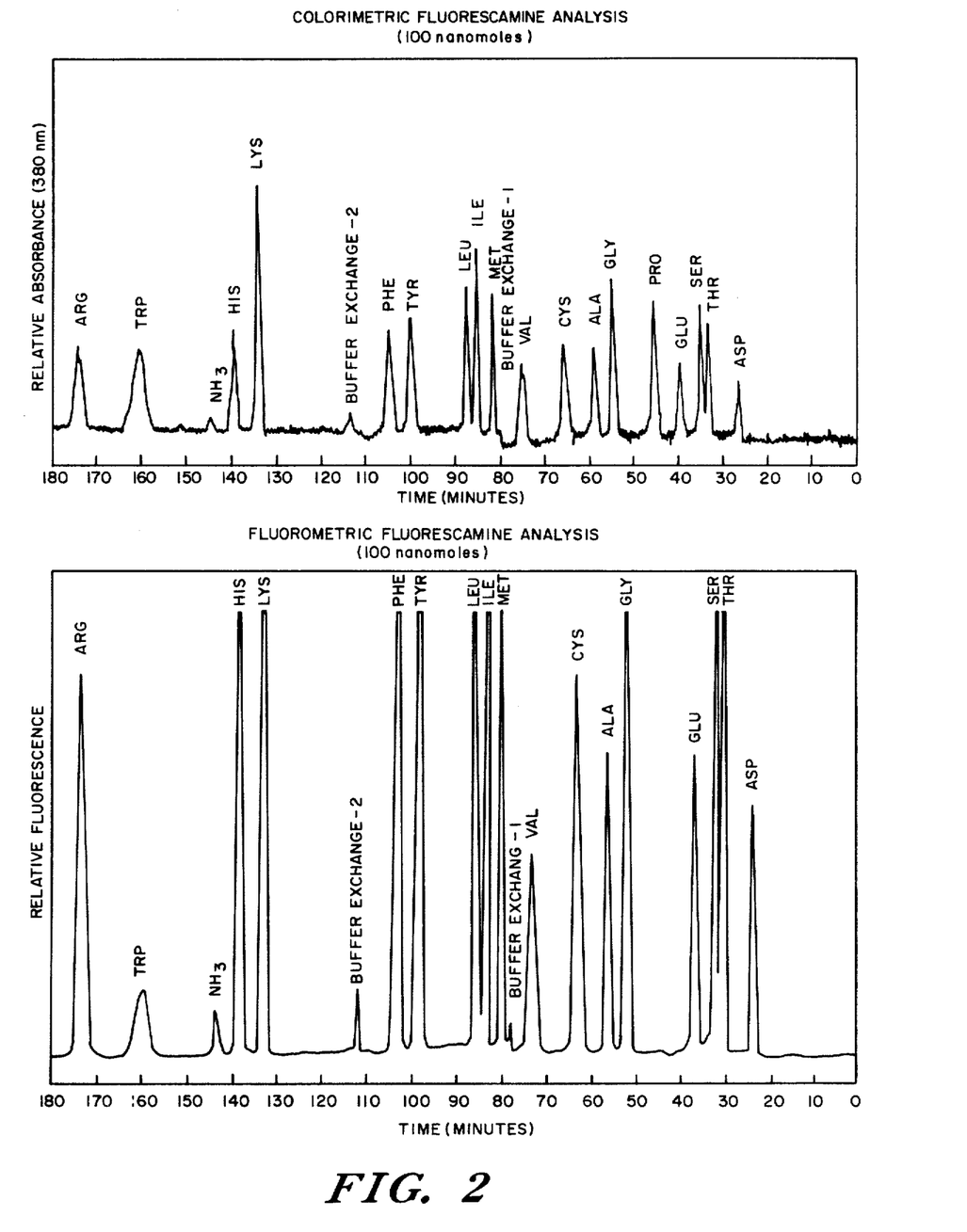

A standard mixture of 100 nanomol of amino acids was resolved and detected simultaneously using the single column fluorometric-colorimetric analyzer shown in FIG. 1. The resultant curves are shown in FIG. 2 (top — 380 nm colorimetric; bottom — fluorometric). Examination of the two curves demonstrates the greater sensitivity achieved by the fluorometric analysis than obtained by the colorimetric analysis. However, the colorimetric analysis gave good peaks for all amino acids in the mixture including a substantial peak for the secondary amino acid proline (PRO) which peak is totally missing from the fluorometric curve as expected.

Integration of the peak area from the colorimetric fluorescamine analysis permits the calculation of operational color values relative to leucine. The results of such calculation are summarized in Table I below:

TABLE I

OPERATIONAL COLOR VALUES OF STANDARD AMINO ACID MIXTURE

| AMINO ACID | ABSORBANCE (380 nm) PEAK AREA | OPERATIONAL COLOR VALUE (relative to Leu) |
|---|---|---|
| Asp | 13.4 | 0.36 |
| Thr | 30.0 | 0.81 |
| Ser | 32.1 | 0.87 |
| Glu | 20.9 | 0.57 |
| Pro | 45.5 | 1.23 |
| Gly | 48.4 | 1.31 |
| Ala | 30.9 | 0.84 |
| Cys/2 | 44.3 | 1.20 |
| Val | 36.8 | 1.00 |
| Met | 31.8 | 0.86 |
| Ile | 40.7 | 1.10 |
| Leu | 36.9 | 1.00 |
| Tyr | 54.0 | 1.46 |
| Phe | 51.9 | 1.41 |
| Lys | 55.0 | 1.49 |
| His | 36.2 | 0.98 |
| NH₃ | 4.2 | 0.11 |
| Trp | 71.4 | 1.93 |
| Arg | 34.2 | 0.93 |

Figure 3:
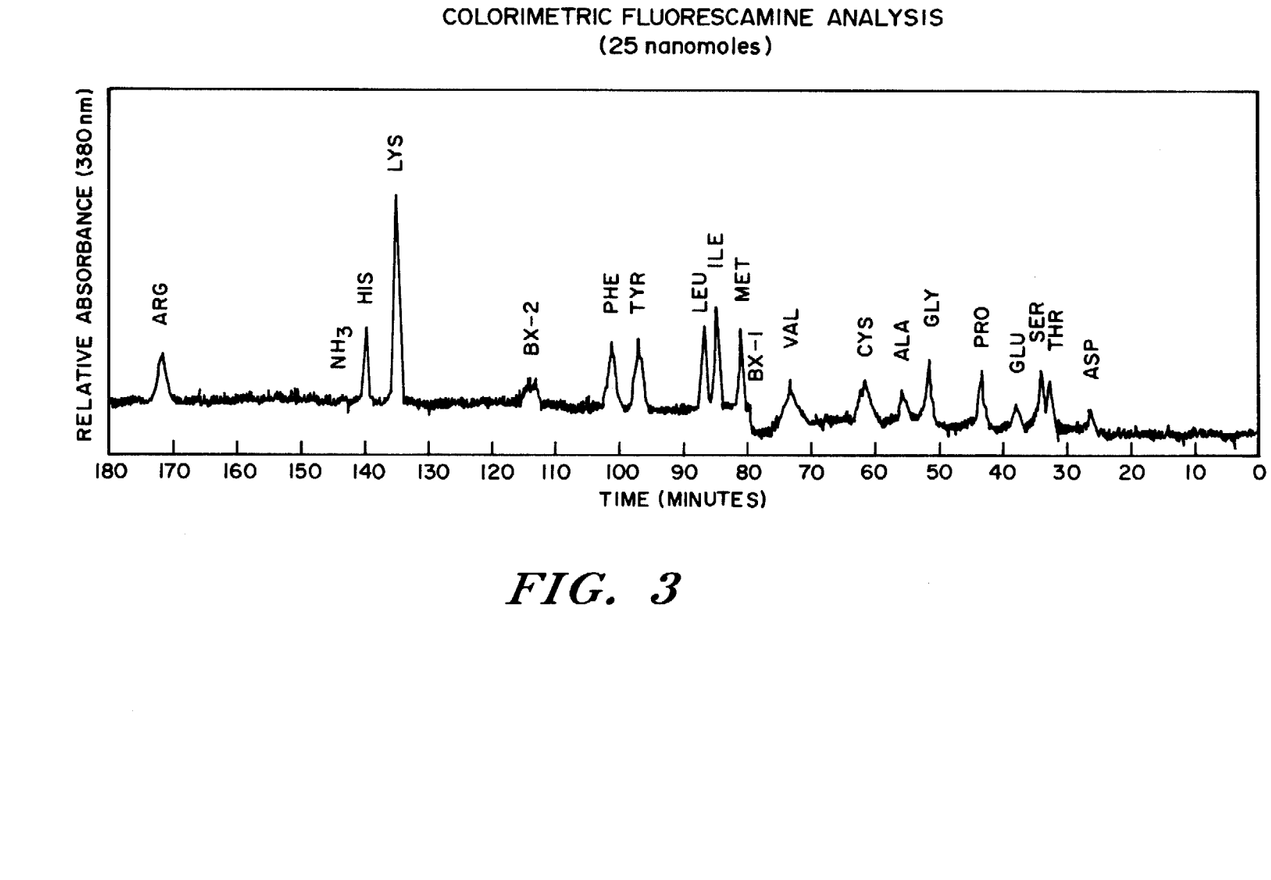

The sensitivity of the colorimetric procedure of the present invention is further demonstrated by the spectra set forth in FIG. 3 which represents a colorimetric fluorescamine analysis of a 25 nanomole standard amino acid mixture.

Figure 4:
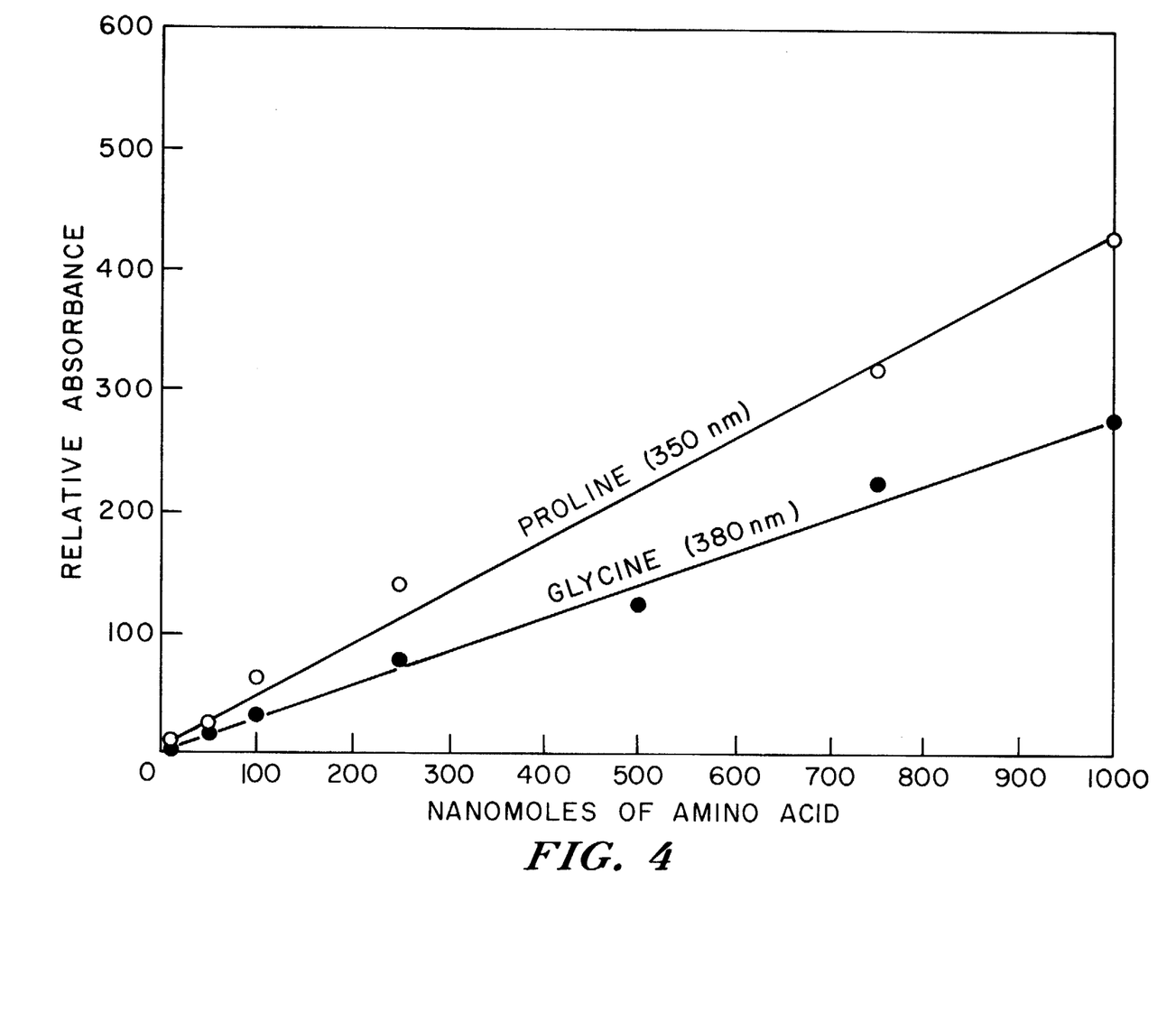

As indicated previously, one of the main advantages of the colorimetric procedure of the present invention resides in the fact that relative absorbance observed is linear over a large concentration range of amino acid concentration. This linearity is clearly demonstrated with the primary amino acid glycine over the 10 to 1,000 nanomole range and with the secondary amino acid proline over the same concentration range in FIG. 4.

Figure 5:
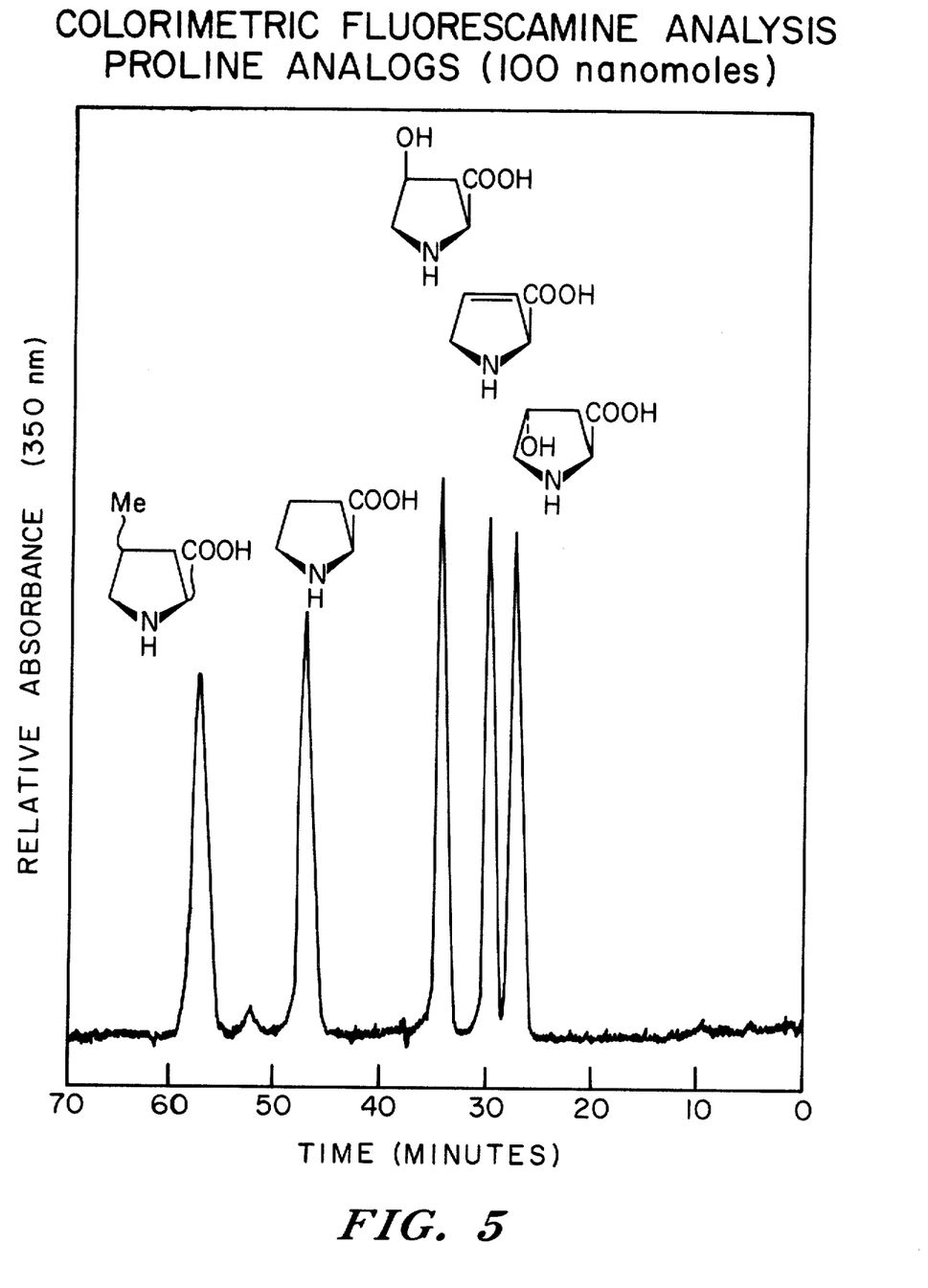

The versatility of the present colorimetric procedure is shown by FIG. 5 where the results of colorimetric fluorescamine analysis of several proline analogs are set forth using a concentration of 100 nanomoles of each amino acid.

Figure 6:
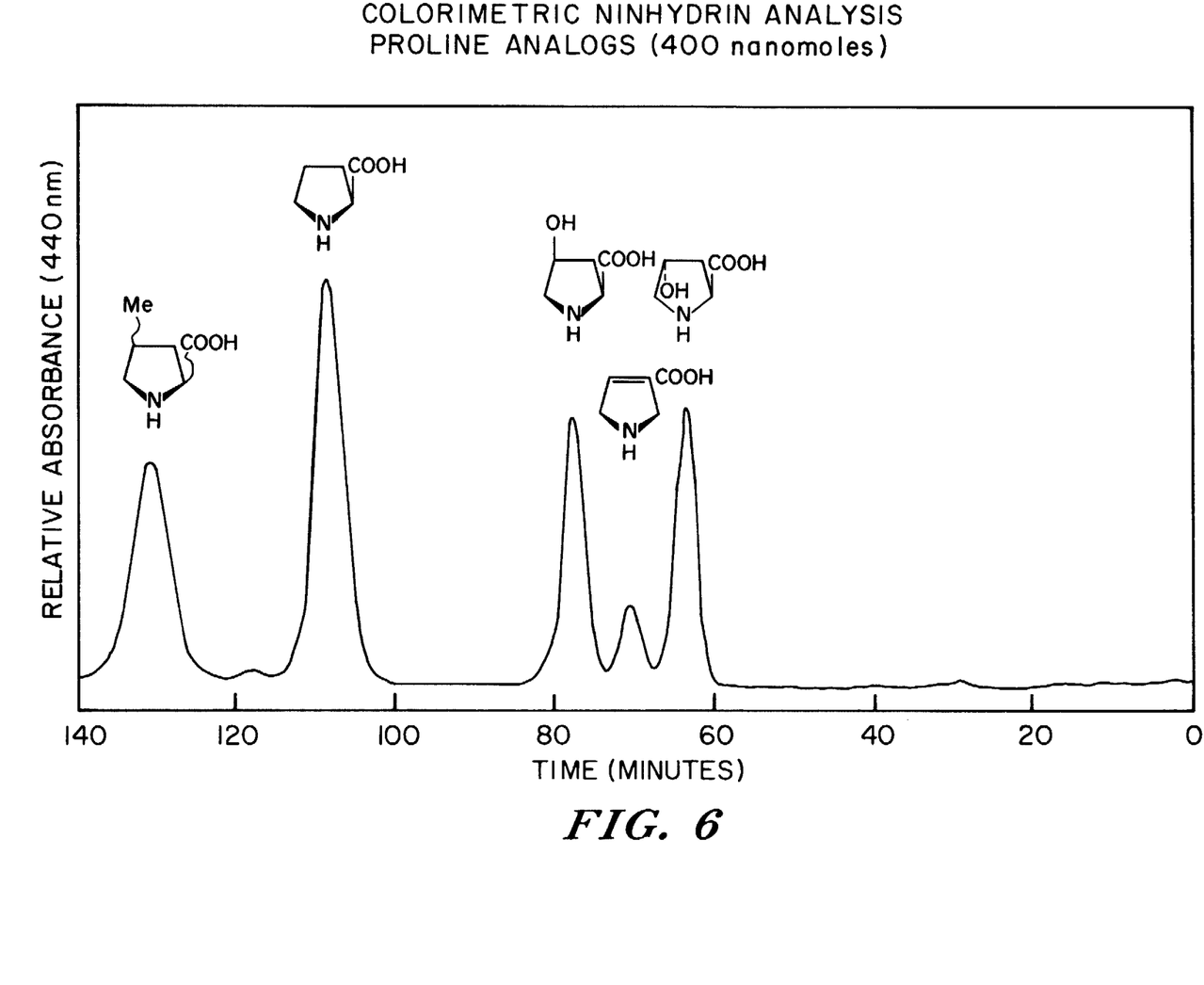

For the sake of comparison, FIG. 6 shows the spectra obtained from conventional ninhydrin colorimetric analysis with the same proline analogs except that the concentration is increased fourfold to 400 nanomoles. It is evident that the colorimetric fluorescamine analysis provides a very substantial increase in sensitivity over the colorimetric ninhydrin analysis when utilized with a secondary amine substrate.

Figure 7:
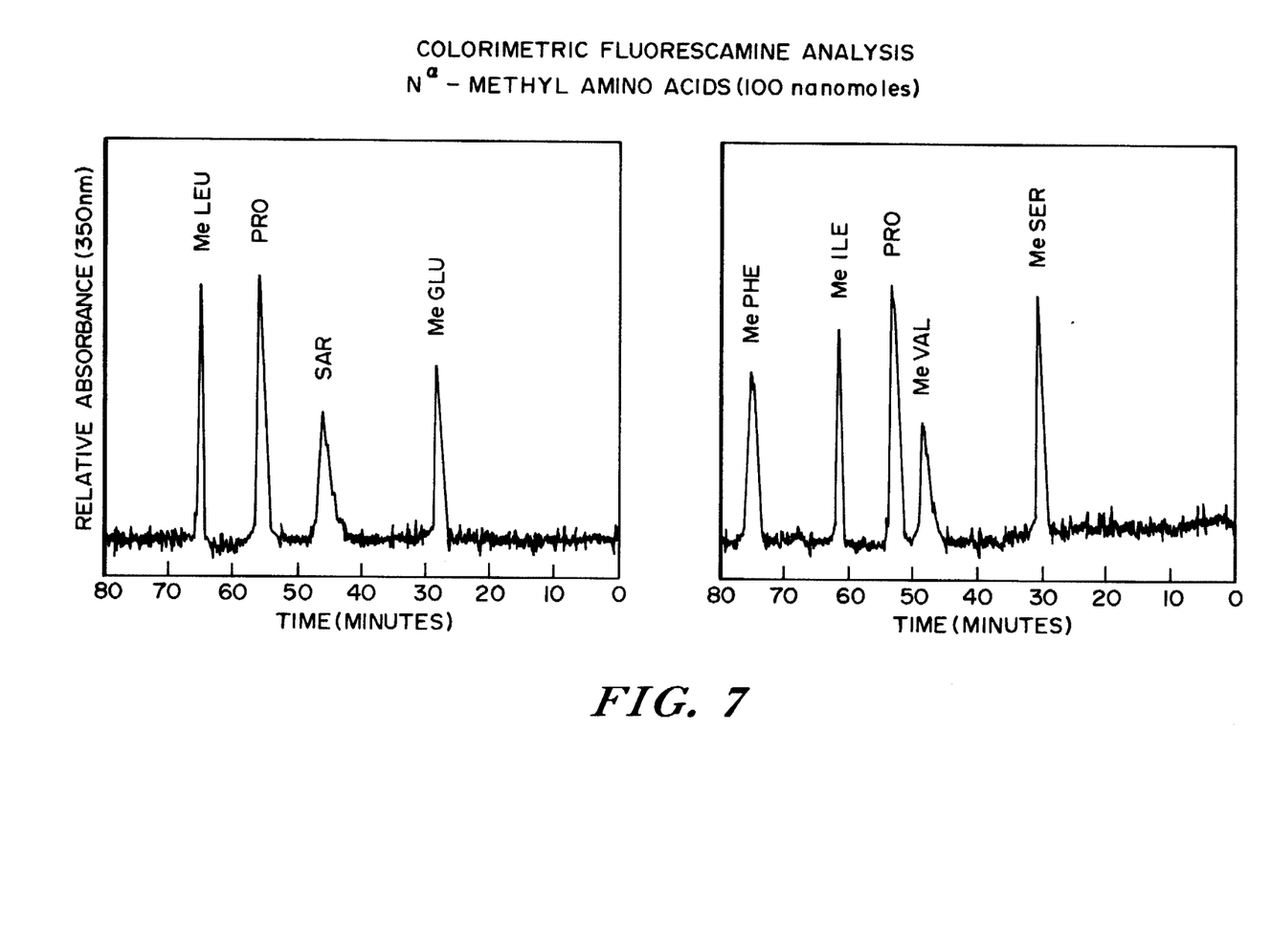
Figure 8:
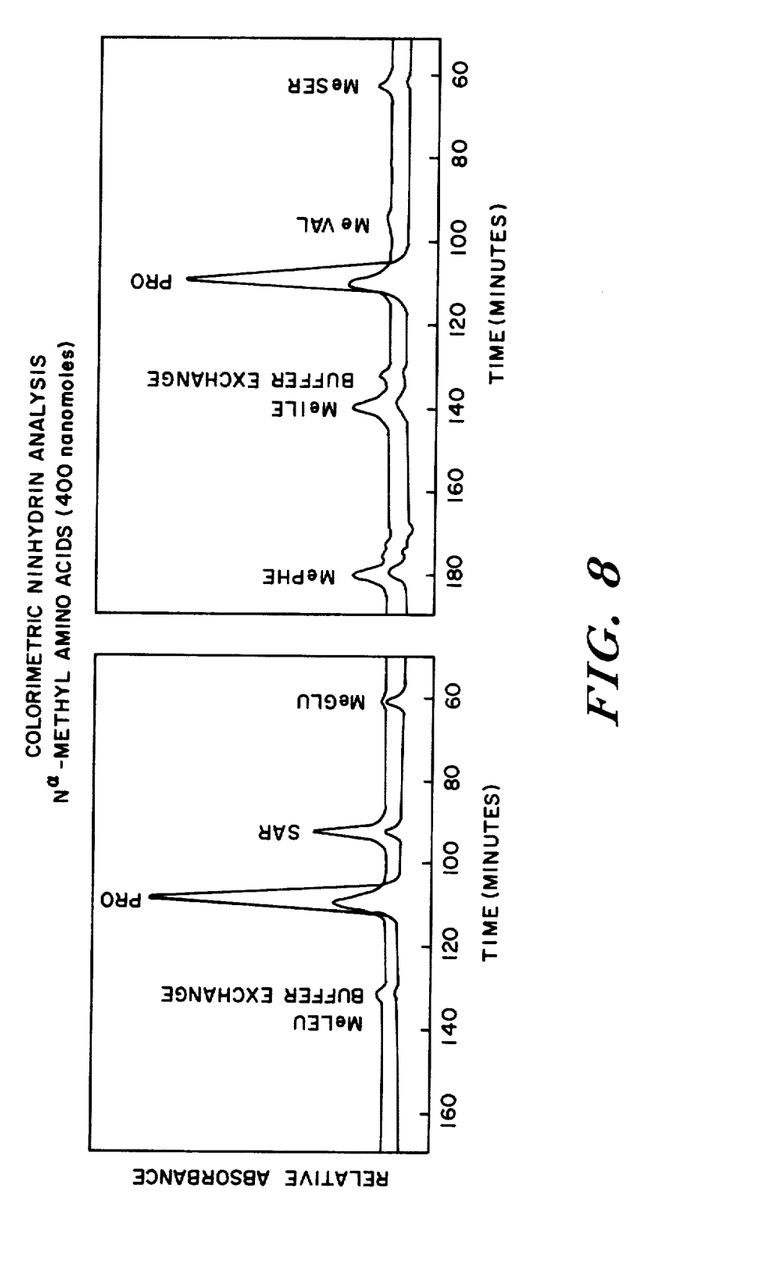

A further comparison of the two procedures using standard mixtures of N$^\alpha$-methylamino acids is shown in FIG. 7 (colorimetric fluorescamine analysis at 100 nanomoles) and FIG. 8 (colorimetric ninhydrin analysis at 400 nanomoles). Examination of the spectra shows that the colorimetric fluorescamine analysis was able to detect all the N$^\alpha$-methylamino acids at the nanomol level whereas the colorimetric ninhydrin analysis permitted detection only of proline and sarcosine at the 400 nanomole level. Furthermore, it should be noted that the colorimetric ninhydrin analysis requires readings at two separate wavelengths i.e., 570 nm and 440 nm in order to detect the desired amino acids.

Figures 9, 10:
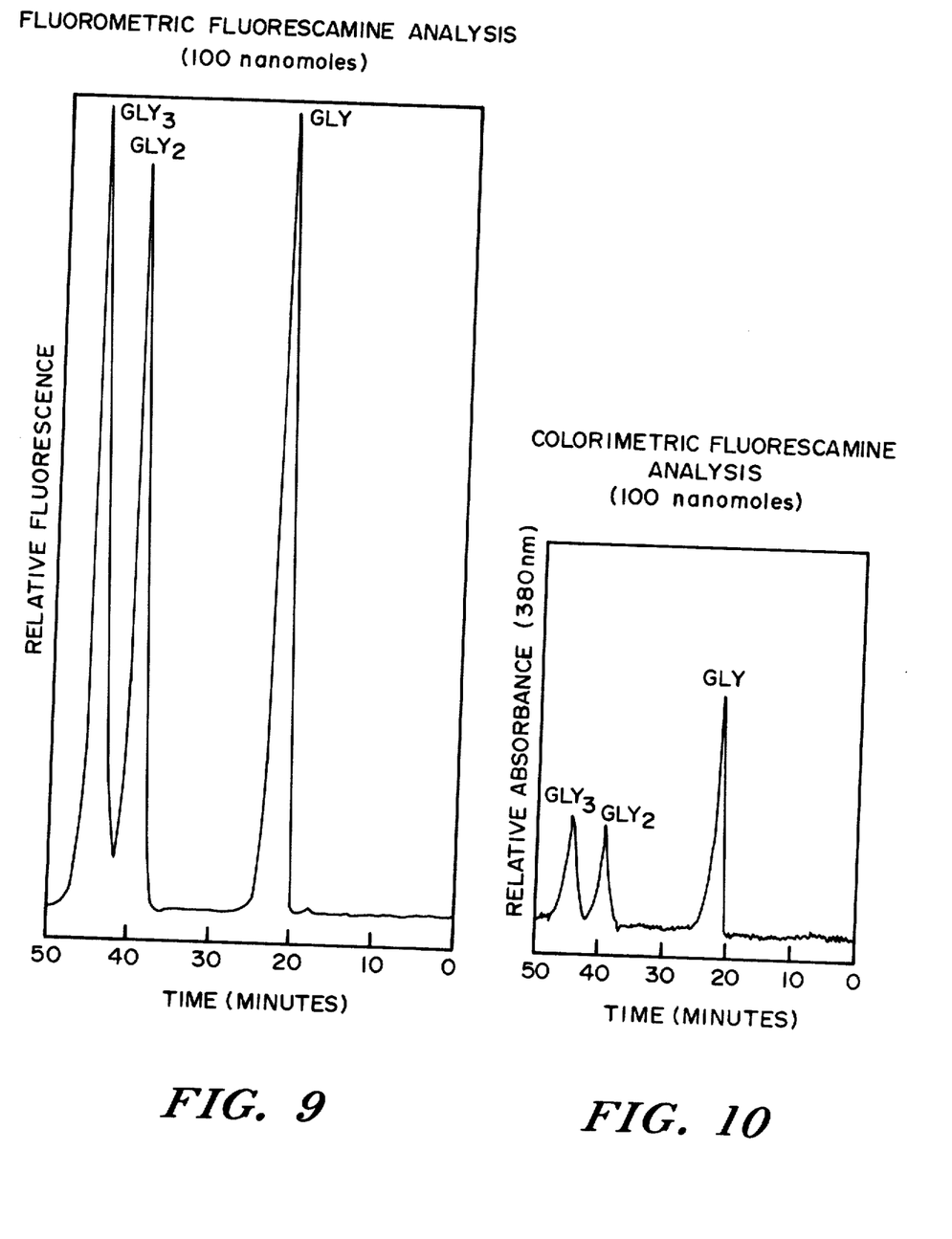
Figure 11:
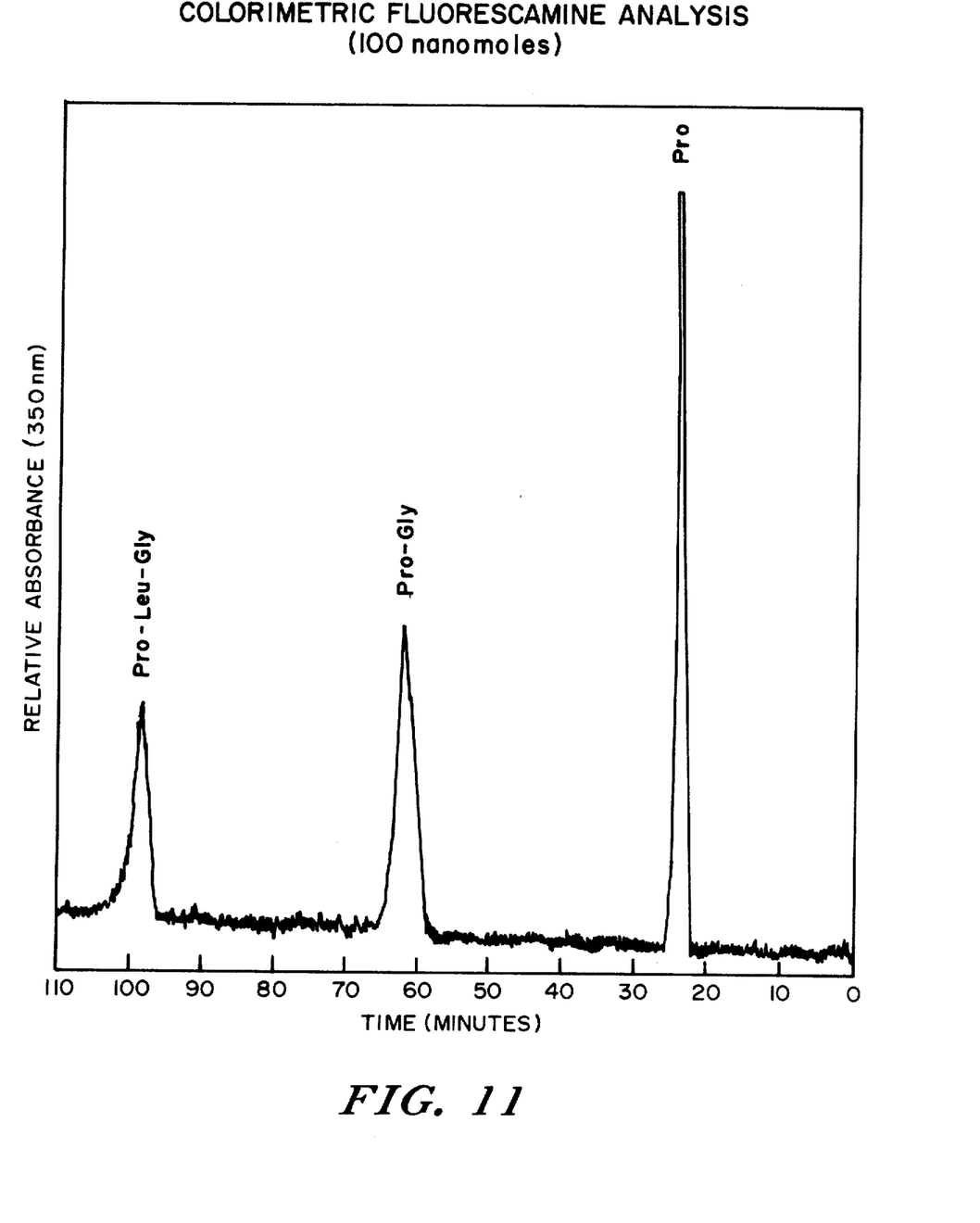

The procedure of the present invention is not limited in applicability to amino acids but is of general usefulness for the estimation of primary and secondary amines. For example, a model dipeptide (Gly-Gly) and tripeptide (Gly-Gly-Gly) were tested to demonstrate the use of the procedure with more complex amino group containing compounds. FIG. 9 gives the results of such tests with the colorimetric fluorescamine procedure. The peak areas for the peptides were somewhat weaker than the corresponding amino acid (Gly). In FIG. 10 the same materials were tested in the fluorometric system to yield the indicated spectra. FIG. 11 represents a curve obtained from the colorimetric fluorescamine analysis of proline and N-terminal prolyl peptides at the 100 nanomole level. It demonstrates that the present assay can readily detect N-terminal secondary amino acid containing peptides which are a class of compounds not previously detectable by fluorometric analysis. It is seen that the peak areas for the peptides were about the same as the model amino acid. Thus, for the purposes of this specification and claims the term "amino acid" is meant to include both amino acids per se and other substances containing primary or secondary amino groups, notably those of biological importance, such as peptides, proteins, biogenic amines, aminoglycosides, etc.

We claim:
1. A method for the colorimetric assay of primary and secondary amino acids which method comprises:
   a. treating an amino acid containing sample with a compound of the formula wherein R is hydrogen, halogen, lower alkyl or lower alkoxy and R' is lower alkyl or aryl
so as to produce a chromophor; and,
   b. detecting said chromophor colorimetrically utilizing monochromatic light having a wavelength in the range of 300–410 nanometers.

2. The assay method of claim 1 wherein said compound of formula I is 4-phenylspiro[furan-2(3H)-1'-phthalan]-3,3'-dione.

3. The assay method of claim 1 wherein said sample contains primary amino acids and said monochromatic light has a wavelength in the range of 380–410 nanometers.

4. The method of claim 1 wherein said sample contains secondary amino acids and said monochromatic light has a wavelength in the range of 300 to 380 nanometers.

5. The assay method of claim 1 wherein said sample contains both primary and secondary amino acids and said monochromatic light has a wave-length of about 380 nanometers.

6. An assay method for detecting primary and secondary amino acids which method comprises:
   a. treating a sample containing amino acids with a compound of the formula wherein R is hydrogen, halogen, lower alkyl or lower alkoxy and R' is lower alkyl or aryl
so as to produce a mixture of fluorophors and chromophors; and,
   b. simultaneously detecting said chromophors and flurophors, respectively, colorimetrically and fluorometrically wherein any primary amino acids in said sample will be detected both fluorometrically and colorimetrically and any secondary amino acids present in said sample will be detected only colorimetrically.

7. The assay method of claim 6 wherein said colorimetric and fluorometric detection are conducted utilizing monochromatic light having a wavelength of about 380 nanometers.

8. The assay method of claim 6 wherein said compound of formula 1 is 4-phenylspiro[furan-2(3H)-1'phthalan]-3,3'-dione.

* * * * *